United States Patent Office 2,816,719
Patented Dec. 17, 1957

2,816,719

ARRANGEMENT FOR THE STOPPING AND DISPATCHING CARRIER CAPSULES IN PNEUMATIC TUBE SYSTEMS

Eberhard Richert, Berlin-Steglitz, Germany, assignor to International Standard Electric Corporation, New York, N. Y., a corporation of Delaware Application March 29, 1956, Serial No. 574,760

Claims priority, application Germany April 12, 1955

3 Claims. (Cl. 243—38)

In pneumatic tube systems it is often necessary to stop or brake the carriers at certain points and to retain them until the pneumatic tube is ready to effect their further travel. To this end the carrier capsule passes a device which serves to reduce its speed, and thereupon, it drops into a chamber which, by means of mechanical arrangements, is locked after the arrival of the carrier and is reopened as soon as the carrier is selected for departure. In conventional types of such arrangements this chamber is accommodated in a drum which, for the purpose of effecting the locking and releasing of the carrier, is moved by means of an electromotor, or is actuated in some other way. In some conventional arrangements the direction of travel of the carrier is changed in the course of this operation.

Arrangements are also known in which blocking devices engage the track of the carrier capsule. If, however, in such a case two carriers approach the blocking device either directly behind one another or with a small distance between each other, then the blocking device is prevented from being moved into the traveling tube, because it meets against the second carrier in the tube. It is possible to insert a separator member having a cutting-edge between such two carriers but then it is necessary that the carriers always have the same length in order to define exactly the location of this separator member. Moreover, it is necessary to provide sufficient power for actuating such a blocking arrangement. It is difficult to maintain exactly equal lengths of the carriers, especially due to the wear of the traveling felts, and the insertion of a cutting-edge separator between two carriers requires complicated mechanical arrangements, which, in most cases, have to be operated by a motor. Hence it is an object of the invention to provide an arrangement which avoids these disadvantages.

The invention relates to an arrangement for the stopping and releasing of carrier capsules in pneumatic tube systems by means of stopping arrangements projecting into the traveling path of the carrier. According to the invention, the pneumatic tube is provided with a widened or enlarged section in the plane of the stopping device. This widening is offset in one direction and is of about such size as is required by the stopping device when projecting into the pneumatic tube in the blocking condition. The enlarging of the tube which, in the case of a round carrier, results in a somewhat elongated cross-section of the pneumatic tube, reverts to the original cross-section after a stretch of about the length of one carrier, and hence gradually merges into a circular cross-section. In this way it is possible to displace the carrier which has approached the zone of stoppage, into one side of the enlarged cross-section so that the locking device, despite the presence of the carrier inside the tube, can be swivelled into the locking position. A carrier arriving in the tube with the normal-size diameter now can not pass this locking device because it will either meet the carrier which is already in the zone of stoppage, or it will meet the locking bolt which is swivelled into its locking position. Moreover, after the removal of the first arrived carrier, the locking device may remain closed, so that the next successive carrier can not follow immediately.

According to another feature of the invention the arrangement for stopping and releasing the carriers consists of two locking bolts which, at a distance of about the length of one carrier, are staggered in the longitudinal direction of the tube and can either be shifted or swivelled into the traveling path of the pneumatic tube carriers. These locking bolts are coupled with one another in such a way that one of these bolts, upon actuation, performs the closure while the other one opens, and vice versa. These bolts, by way of example, may consist of quadrants which are pivoted at their centers near the wall of the tube and vertically in relation to the tube axis. The coupling of the two locking bolts is appropriately effected by means of a lever system, and the control of this lever system may be effected by means of a pull magnet and a restoring spring or by other suitable means.

In accordance with another feature of the invention the pneumatic tube is provided in the region of the first locking bolt in the traveling direction, with a bend of preferably 7 or 8°.

According to another embodiment of the invention there is further provided a third locking bolt, which is arranged a short distance behind the second locking bolt in the traveling direction, and which serves to retain the carrier, for a short interval immediately after the release, in a zone in which a target or destination identification means, attached to it, is being explored in any known manner for the further control of its traveling path. This locking arrangement, also, is actuated by means of a pull magnet and a restoring spring and its control is effected e. g. via a timing switch.

For enabling a better understanding of the invention reference is made to the accompanying drawings, in which:

Fig. 1 shows the stopping device according to the invention, whereas

Figure 1:
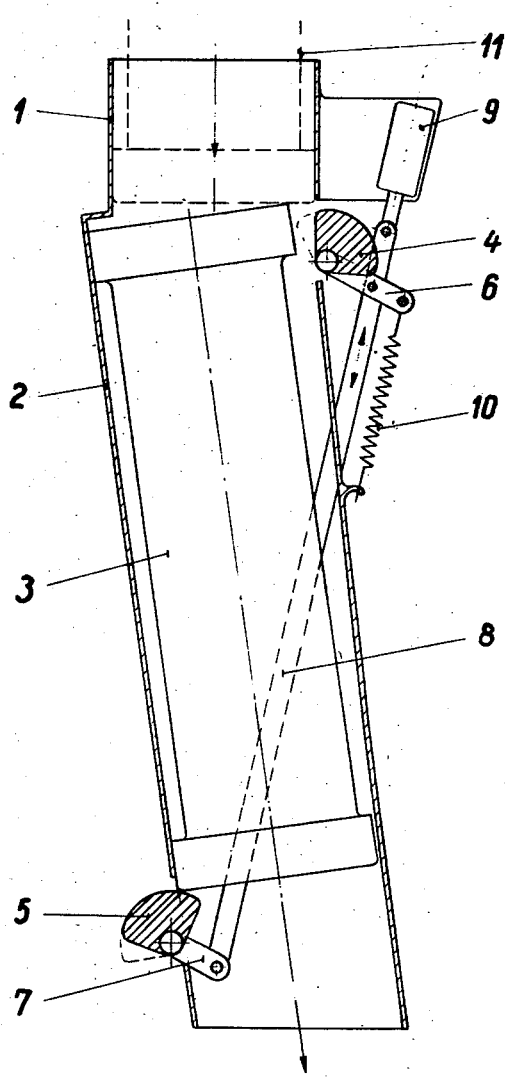

In Fig. 1 the reference numeral 1 indicates the incoming tube and 2 the outgoing tube. The outgoing pneumatic tube 2 is enlarged around that part of its circumference opposite the locking bolt 4, by such an extent as is required to permit movement of this bolt into the traveling path when going to its locking condition or position. The carrier capsule 3 inside the tube 2 is thereby brought into such a position that it projects into the offset enlargement. The direction of the tube 2, with respect to the tube 1 is deflected by about 7 to 8°, so that the next successive carrier 11 will meet against the edge of the carrier 3 adjacent the bolt 4. At the other end of the carrier 3 the cross-section of the pneumatic tube has again merged into its normal-size diameter.

When the locking bolt 4 is in the released position, the locking bolt 5 serves to block the carrier. The pivots of the locking bolts are located a little outside the tube so that in the swivelled-out or release condition, they do not obstruct the tube. They are connected with each other by means of a lever system comprising lever arms 6 and 7 and the link 8 through which the locking bolts are actuated simultaneously but in opposite directions. The pull magnet for the actuation of the lever system 8 is denoted by 9 and the restoring spring is denoted by 10.

In the normal condition the locking device occupies the position shown in Fig. 1. The carrier 3 is free to travel into the outgoing tube 2, but is then retained by the locking bolt 5 in such a way that a successive carrier 11 will be stopped by the preceding carrier 3. Upon dispatch effected by energizing the pull magnet 9, the bolt 5 releases the carrier 3, while the bolt 4 assumes its locking position. Accordingly the next carrier 11 is prevented from following immediately. As soon as the carrier 3 has left its holding position, the restoring spring 10 returns the locking bolts to their normal positions. Now the carrier 11 is permitted to travel on to the bolt 5 where it will await its dispatch, while a subsequently following carrier will be held in the tube 1 by meeting the end of the carrier 11.

Figure 2:
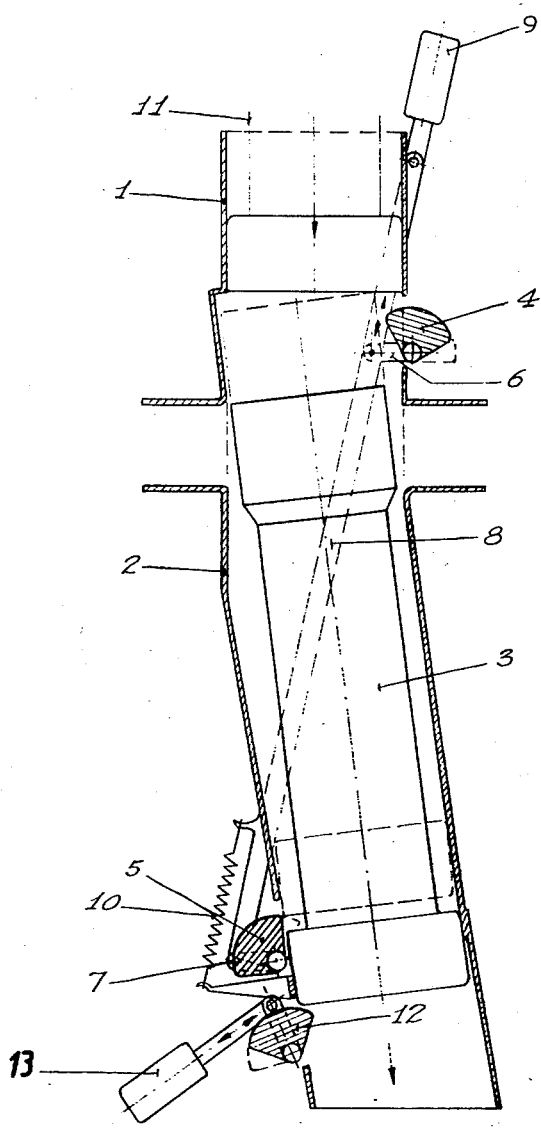
Fig. 2 shows the invention applied in conjunction with a device for exploring a target identification.

The exploring of the target identification is intended to be effected immediately before the departure of a carrier which occupies the position of the carrier 3. To this end besides the locking bolts 4 and 5 there is also provided a third bolt 12 which is shown in Fig. 2. Immediately upon the release of the carrier 3 upon actuation of the pull magnet 9, the carrier 3 will be brought into the position in which the exploring of the target identification is effected. The bolts 4 and 5 can only assume their normal positions after the carrier has passed both of the locking bolts. Hence the carrier 11 can only follow after the bolt 12 has been actuated to permit the carrier 3 to depart from the stopping position.

The stopping device according to the invention permits an effective stopping of the carrier capsules and allows them to be individually dispatched, even when a plurality of carriers has accumulated in the tube 1. The turning of the bolt 4 is neither prevented nor impaired by a carrier located in the stopping zone. For actuating the arrangement there are only required small forces produced by one or two pull magnets respectively, which directly engage the lever system 8 and do not require any kind of gearing, etc. For this reason the arrangement provides reliable operation, is cheap to install and requires little attention.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An arrangement for stopping and dispatching carrier capsules in pneumatic tube systems comprising a stopping device projecting into the tube in the path of travel of the carriers, said tube being formed in the region of the stopping device with an off-set enlargement extending in one direction, the off-set distance being substantially equal to the distance that said stopping device projects into the tube in the blocking condition and in which over a stretch of said tube approximately equal to the length of one pneumatic tube carrier, said offset enlargement is gradually reduced to the original size of the cross-section of the tube.

2. An arrangement according to claim 1 in which said stopping device comprises two quadrant-shaped locking bolts which are located along the tube at a distance apart of about the length of one carrier and on opposite sides of the tube, said bolts being mounted for rotary movement into the tube and coupled by a lever external to said tube whereby when one of them is projected into the tube, the other is withdrawn, and vice versa.

3. An arrangement according to claim 2, in and further comprising a magnet and restoring spring for controlling said lever system.

References Cited in the file of this patent

UNITED STATES PATENTS

| 1,103,952 | Fisher | July 21, 1914 |
| 1,449,996 | Hepperle | Mar. 27, 1923 |
| 1,494,696 | Maclaren | May 20, 1924 |
| 2,709,555 | Schroder | May 31, 1955 |

FOREIGN PATENTS

| 486,277 | Germany | Nov. 14, 1929 |
| 609,423 | Great Britain | Sept. 30, 1948 |